(12) United States Patent
Kajitani et al.

(10) Patent No.: US 8,280,692 B2
(45) Date of Patent: Oct. 2, 2012

(54) ULTRASONIC WAVE PROPAGATION TIME MEASURING SYSTEM

(75) Inventors: Hiroshi Kajitani, Minato-ku (JP);
Junichi Miyamoto, Minato-ku (JP)

(73) Assignee: NEC Corporation, Tokyo (JP)

( * ) Notice: Subject to any disclaimer, the term of this patent is extended or adjusted under 35 U.S.C. 154(b) by 317 days.

(21) Appl. No.: 12/675,683

(22) PCT Filed: Aug. 28, 2008

(86) PCT No.: PCT/JP2008/065372
§ 371 (c)(1),
(2), (4) Date: Feb. 26, 2010

(87) PCT Pub. No.: WO2009/028591
PCT Pub. Date: Mar. 5, 2009

(65) Prior Publication Data
US 2010/0228523 A1 Sep. 9, 2010

(30) Foreign Application Priority Data

Aug. 30, 2007 (JP) .................................. 2007-224859
Jun. 18, 2008 (JP) .................................. 2008-159151

(51) Int. Cl.
*G01S 15/00* (2006.01)

(52) U.S. Cl. ..................................... 702/189
(58) Field of Classification Search .................. 702/189, 702/39, 150, 182–185
See application file for complete search history.

(56) References Cited

U.S. PATENT DOCUMENTS 6,118,205 A 9/2000 Wood et al.
6,842,716 B1 * 1/2005 Leleu ............................. 702/178

(Continued)

FOREIGN PATENT DOCUMENTS

JP 2005-291798 A 10/2005

(Continued)

OTHER PUBLICATIONS

"M-Sequences and Applicants", Hiroshi Kashiwagi (Mar. 25, 1996, Shokodo), pp. 16-36.

*Primary Examiner* — Edward Raymond
(74) *Attorney, Agent, or Firm* — Sughrue Mion, PLLC

(57) ABSTRACT

A position detection method and system that eliminate an effect of residual vibration of a piezoelectric or magnetostrictive element, increase correlativity between a received ultrasonic waveform and a model waveform, and are not affected by a reflected wave of an ultrasonic wave signal. A transmission unit of an ultrasonic wave propagation time measuring system of the present invention generates an electromagnetic wave signal including a trigger signal that indicates transmission timing and an ultrasonic wave drive signal by modulating an ultrasonic wave on the basis of a pseudo-random signal with high autocorrelativity at the same time as transmission of the electromagnetic wave signal, and transmits an ultrasonic wave signal of a frequency higher than a frequency of the ultrasonic wave drive signal by an ultrasonic wave transmitter. A reception unit detects the electromagnetic wave signal and the ultrasonic wave signal, and is provided with a data processing circuit for computing, with the ultrasonic wave drive signal as a model waveform, correlation values between the detected ultrasonic wave signal and the model waveform, detecting a main peak value of the computed correlation values, and computing an ultrasonic wave propagation time from a point in time of detection of the electromagnetic wave signal and a point in time of detection of the main peak value.

20 Claims, 18 Drawing Sheets

U.S. PATENT DOCUMENTS

| | | | |
|---|---|---|---|
| 2003/0052795 A1* | 3/2003 | Schlick et al. | 340/903 |
| 2003/0144814 A1* | 7/2003 | Hama et al. | 702/159 |
| 2005/0231068 A1 | 10/2005 | Tokumaru et al. | |
| 2007/0046145 A1 | 3/2007 | Tokumaru et al. | |

FOREIGN PATENT DOCUMENTS

| | | |
|---|---|---|
| JP | 2007-040734 A | 2/2007 |
| JP | 2007-085867 A | 4/2007 |
| WO | 2005/111653 A2 | 11/2005 |

* cited by examiner

S1,S2,S3 : PHASE MODULATION TRACKING POINT
A1 : IN-PHASE AMPLIFICATION REGION
D1 : REVERSE PHASE DAMPING REGION

M-SEQUENCE PHASE MODULATION SIGNAL (CASE OF MAKING 0/1 BIT CORRESPOND TO 1/-1)

FREQUENCY CHARACTERISTIC OF M-SEQUENCE PHASE MODULATED WAVE

DIFFERENCE BETWEEN FIRST AND SECOND PEAKS IS ABOUT 0.1

(CASE WHERE REFERENCE WAVEFORM IS NOT FILTERED)

DIFFERENCE BETWEEN FIRST AND SECOND PEAKS IS ABOUT 0.4,
WHICH IS LARGE COMPARED TO CASE OF NO FILTER (CASE WHERE REFERENCE WAVEFORM IS FILTERED)

M-SEQUENCE BIT PATTERN (100110101111000)

M-SEQUENCE BIT PATTERN (000100110101111)

M-SEQUENCE BIT PATTERN (111100010011010)

M-SEQUENCE BIT PATTERN (110001001101011)

ULTRASONIC WAVE PROPAGATION TIME MEASURING SYSTEM

RELATED APPLICATION

This application is based upon and claims the benefit of the priority of Japanese Patent Application No. 2007-224859 (filed on Aug. 30, 2007) and also Japanese Patent Application No. 2008-159151 (filed on Jun. 18, 2008), the disclosure of which is incorporated herein in its entirety by reference thereto.

The present invention relates to a method of measuring propagation time of an ultrasonic wave from an ultrasonic wave generation source as far as a prescribed position, and to an ultrasonic wave propagation time measuring system.

TECHNICAL FIELD

Background Art

As one example of a conventional position detection method using an ultrasonic wave, an electronic pen system is disclosed in Patent Document 1. This position detection system is formed of an electronic pen that has a function of transmitting an ultrasonic wave signal of a fixed waveform at a fixed period and an infrared trigger signal at a fixed period, and a reception unit for receiving the two transmitted signals, and the reception unit identifies the position of the electronic pen from the point in time at which the trigger signal arrives and the point in time at which the ultrasonic wave arrives.
[Patent Document 1]
US Patent Specification No. 6118205

SUMMARY

The following analysis is given by the inventors.

An ultrasonic wave signal transmitted from an ultrasonic wave generation source must be at least 20 kHz, in order to use a frequency that cannot be heard by a human and is above the audible range. As a means of generating a signal in this frequency range with sufficient sound pressure, a so-called speaker, which electromagnetically vibrates a small-sized diaphragm of high rigidity, is known, but since miniaturization is difficult and since power consumption is large due to electrical current driving, implementation in a small-sized movable object such as an electronic pen or the like is difficult. As a result, a piezoelectric element driven by voltage is widely used as an ultrasonic wave generation source.

Since this piezoelectric element is of a voltage driving form, power consumption is generally low, but in order to ensure adequate sound pressure, usage is often combined with a resonator of low acoustic impedance. However, in a case of using a resonance phenomenon, it is possible to transmit an ultrasonic wave at a constant phase, frequency and gain, but transmission gain at other frequencies is quite low, and it is difficult to use various types of modulation method. Furthermore, even with an individual piezoelectric element, mechanical Q is high and residual vibration is prolonged, so that it is difficult to transmit the ultrasonic wave tracking a modulated wave, irrespective of the modulation method.

On the other hand, in order to continuously perform propagation time measurement, it is necessary to synchronously transmit the ultrasonic wave based on a trigger signal of a fixed period. If this period is, for example, 20 ms, a single or a burst signal is heard as an audible sound of 50 Hz. This type of audible sound is preferably eliminated as much as possible.

It is an object of the present invention to provide a position detection method and system for a moveable body, which eliminates an effect of residual vibration occurring in an ultrasonic wave transmitting body formed of a piezoelectric or magnetostrictive element installed on the moving body, and enables accurate measurement of propagation time of a direct wave that arrives first at a reception unit for each period of the ultrasonic wave signal sent from the ultrasonic wave transmission body, and is not affected by a reflected wave of an ultrasonic wave signal. A further object of the present invention is to enable a low cost position detection method and system by using a narrow band ultrasonic wave.

In a first aspect of the present invention, an ultrasonic wave propagation time measuring system according to the invention is characterized by being provided with: an electromagnetic wave transmission unit transmitting an electromagnetic wave signal indicating transmission timing, a unit generating an ultrasonic wave drive signal by modulating an ultrasonic wave based on a pseudo-random signal with high autocorrelativity at the same time as the transmission of the electromagnetic wave signal, an ultrasonic wave transmission unit that is driven by the ultrasonic wave drive signal and formed from a piezoelectric or magnetostrictive element for transmitting an ultrasonic wave signal of frequency higher than a fundamental frequency of the ultrasonic wave drive signal, an electromagnetic wave reception unit detecting the electromagnetic wave signal, an ultrasonic wave reception unit detecting the transmitted ultrasonic wave signal, and a data processing unit, having a waveform the same as the ultrasonic wave drive signal as a model waveform, that computes correlation values between the detected ultrasonic wave signal and the model waveform, detects a main peak value of the computed correlation values, and computes ultrasonic wave propagation time from a point in time of detection of the electromagnetic wave signal and a point in time of detection of the main peak value.

In another aspect of the present invention, an ultrasonic wave propagation time measuring system according to the invention is characterized by being provided with: an electromagnetic wave transmission unit transmitting an electromagnetic wave signal indicating transmission timing, a unit generating an ultrasonic wave drive signal by modulating an ultrasonic wave based on a pseudo-random signal with high autocorrelativity at the same time as the transmission of the electromagnetic wave signal, an ultrasonic wave transmission unit, having a point of resonance at a frequency higher than, in particular a frequency 1.5 times or more than, frequency of the ultrasonic wave drive signal, being driven by the ultrasonic wave drive signal, and formed from a piezoelectric or magnetostrictive element for transmitting an ultrasonic wave signal, an electromagnetic wave reception unit detecting the electromagnetic wave signal, an ultrasonic wave reception unit detecting the transmitted ultrasonic wave signal, and a data processing unit, having a waveform the same as the ultrasonic wave drive signal as a model waveform, that computes correlation values between the detected ultrasonic wave signal and the model waveform, detects a main peak value of the computed correlation values, and computes ultrasonic wave propagation time from a point in time of detection of the electromagnetic wave signal and a point in time of detection of the main peak value.

The ultrasonic wave transmission unit preferably has a point of resonance at a frequency that is substantively an integral multiple of the frequency of the ultrasonic wave drive signal.

The ultrasonic wave transmission unit preferably has a point of resonance at a frequency that is substantively an even number multiple of the frequency of the ultrasonic wave drive signal.

The ultrasonic wave reception unit is preferably formed of any of a piezoelectric element, a magnetostrictive element, or a microphone.

With regard to the modulated ultrasonic wave drive signal, M periods (M is an integer ≧1) of an ultrasonic wave are preferably assigned per 1 bit of the pseudo-random signal. Modulation includes frequency modulation and amplitude modulation, in addition to phase modulation.

As a preferred embodiment, the ultrasonic wave transmission unit can be a structure having a point of resonance at a frequency that is substantively 2N times (N is a positive integer) the frequency of the drive signal.

The ultrasonic wave drive signal is a signal that is modulated (for example, phase-modulated) by the pseudo-random signal, and with regard to the modulated ultrasonic wave drive signal, a number of ultrasonic wave periods equal to the abovementioned M are assigned per 1 bit of the pseudo-random signal.

The ultrasonic wave drive signal is preferably generated at a signal beginning and at least a phase modulation point.

Furthermore, the ultrasonic wave drive signal is preferably generated only at a signal beginning and a phase modulation point.

Vibration gain for resonant frequency of the ultrasonic wave transmission unit is preferably larger than vibration gain for the frequency of the ultrasonic wave drive signal.

The ultrasonic wave reception unit preferably has a frequency band greater than or equal to the frequency of the ultrasonic wave drive signal.

In addition, the ultrasonic wave reception unit can have a frequency band up to a frequency of 2N times (that is, an even number multiple) the ultrasonic wave drive signal.

The pseudo-random signal is preferably M-sequence data. By selecting a bit string of the M-sequence data in this way, since residual vibration is small and correlation improvement can be anticipated, higher speed and more accurate ultrasonic wave propagation time measurement is possible.

The electromagnetic wave signal is preferably an infrared signal.

Furthermore, the ultrasonic wave transmission unit can be installed in the movable body. The moveable body may be, for example, an electronic pen or a robot.

The M-sequence data is a code formed from 15 bits generated by a 4th degree characteristic polynomial, and the end of the bit string preferably has at least 2 bits the same.

The M-sequence data is a code formed from 15 bits generated by a 4th degree characteristic polynomial, and the end of the bit string is preferably 1111 or 000.

In addition, the M-sequence data is a code formed of 15 bits generated by a 4th degree characteristic polynomial, and the end of the bit string is preferably a sequence of 1111000.

An ultrasonic wave generation circuit making up the ultrasonic wave transmission unit preferably has a wave filter for eliminating drive signals in an audible range. By adding the wave filter to a drive circuit making up an ultrasonic wave transmission unit in this way, it is possible to curb sound wave intensity generated in the audible range, and reduction of stress for humans can be anticipated.

An ultrasonic wave generation circuit making up the ultrasonic wave transmission unit preferably has a wave filter for eliminating a sound wave in a frequency range corresponding to at least an ultrasonic wave transmission period.

An ultrasonic wave generation circuit making up the ultrasonic wave transmission unit preferably has a wave filter for eliminating a sound wave at least in a frequency range corresponding to a modulation period of an M-sequence code. By selecting an M-sequence bit string, it is possible to further improve this effect.

A sound wave directly after being emitted to a space from the ultrasonic wave transmission unit that has the wave filter in the ultrasonic wave generation circuit may preferably be used as a model waveform for a correlation computation.

The M-sequence data is a code formed of 15 bits generated by a 4th degree characteristic polynomial, and the end of the bit string is preferably a sequence of 1111 or 000 in order to realize noise-reduction.

The M-sequence data is a code formed of 15 bits generated by a 4th degree characteristic polynomial, and the end of the bit string is preferably a sequence of 1111000 in order to realize noise-reduction.

As described above, by selecting a piezoelectric transducer element having a high transmission and reception gain, in a higher frequency range, for example, in a frequency range 1.5 times or especially 2N times a frequency of an M-sequence modulation model wave, it is possible to narrow the band of an ultrasonic wave transmission wave with a good modulation characteristic, and as a result, it is possible to realize ultrasonic wave propagation time measurement compactly, with low power consumption, low cost, and with high speed and high accuracy. Furthermore, since the frequency of a transmission ultrasonic wave is higher than a drive frequency, modulation wave reproducibility is good, and it is possible to improve correlativity of a reception wave and a model wave.

PREFERRED MODES

Next, a detailed description of a preferred embodiment for implementing the present invention is given, taking an electronic pen system as an example and making reference to FIGS. 1 to 7. In a robot system, by installing an ultrasonic wave transmission unit at an obstruction and installing a reception unit in a robot, the present invention enables evasive action control by computing distance to the obstruction, and in a medical care system, by having a patient wear an ultrasonic wave transmission unit, the invention enables identifying the location of the patient.

Furthermore, an ultrasonic wave modulation method presents cases of performing phase modulation using an M-sequence signal of a pseudo-random signal with high autocorrelativity, but a similar effect can be anticipated with other modulation methods. In addition, a signal sequence that is the basis of modulation may be a pseudo-random signal, having a signal sequence with high autocorrelativity, and a similar effect can be anticipated with what is referred to as a Gold sequence signal.

Figure 1:
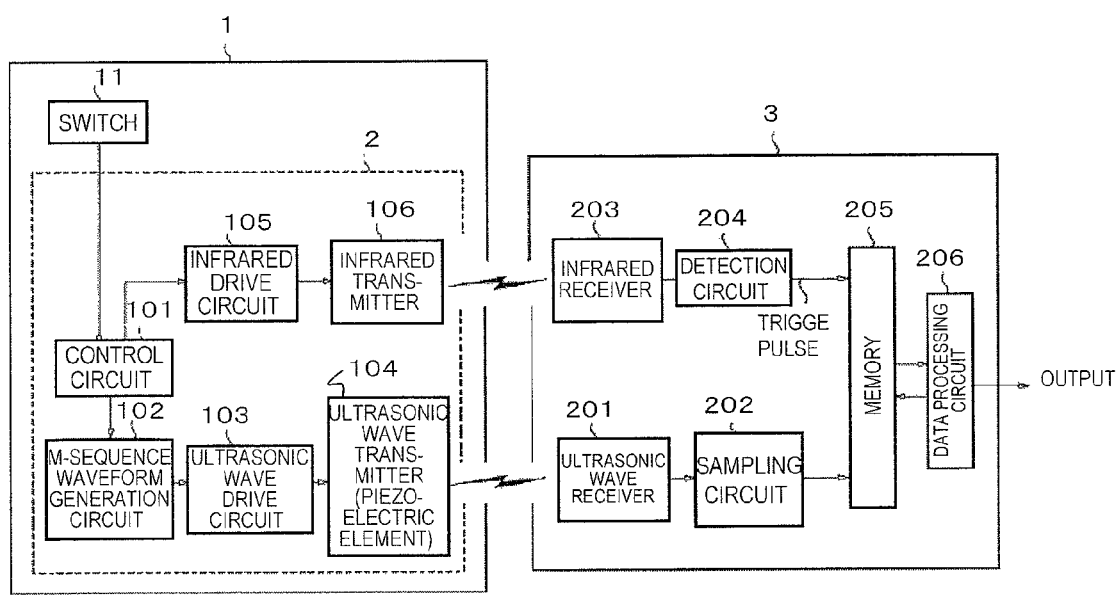
FIG. 1 is a block diagram of one exemplary embodiment of an ultrasonic wave propagation time measuring system according to the present invention.

FIG. 1 is one exemplary embodiment of an ultrasonic wave propagation time measuring system according to the present invention and shows a block diagram of an electronic pen system using an ultrasonic wave position computing system of the present invention. The system is configured from a transmission unit 2 attached to the electronic pen 1 that has a switch 11, and a reception unit 3 installed at a prescribed position separated from this transmission unit. The transmission unit 2 is configured from a control circuit 101, an M-sequence generation circuit (or an M-sequence bit string storage memory) 102, an ultrasonic wave drive circuit 103, an ultrasonic wave transmitter (piezoelectric element or magnetostrictive element) 104, an infrared drive circuit 105, and an infrared transmitter 106.

Figure 2:
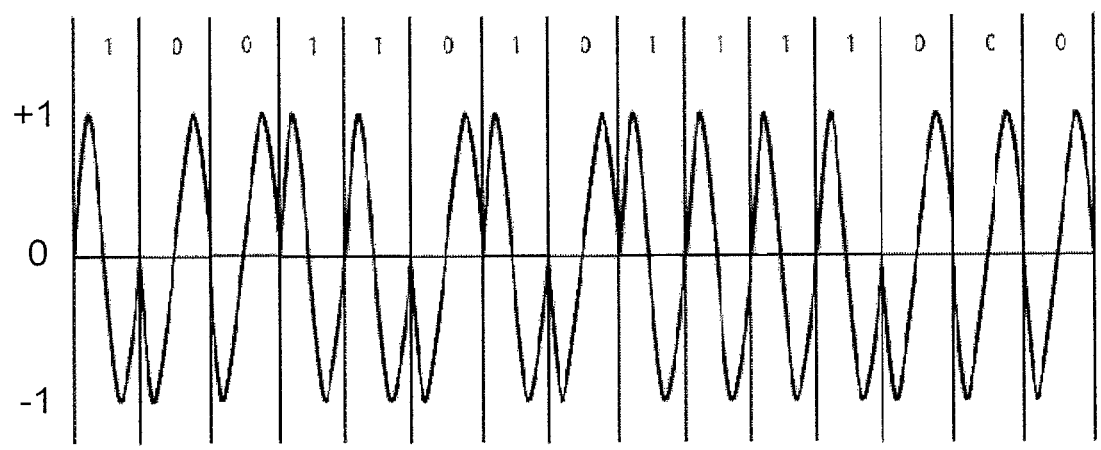
FIG. 2 is one example of a waveform diagram of an ultrasonic wave drive signal that has undergone phase modulation by M-sequence data.

The M-sequence generation circuit 102 generates an M-sequence determined by a characteristic polynomial based on M-sequence initial conditions supplied from the control circuit 101. The M-sequence generation circuit 102 has a 4 bit shift register with a property of, for example, a 4th degree characteristic polynomial $f(x)=x^4+x+1$, or $f(x)=x^4+x^3+1$, and generates a bit string having a sequence length of 15 bits. By changing a 4 bit initial condition, 15 types of different data in which the data sequence is cyclically shifted are obtained. FIG. 2 shows one example of a waveform of an ultrasonic wave drive signal that has undergone phase modulation by an M-sequence. Each 1 bit of the 15 bit M-sequence data "000100110101111" is made to correspond to one period of the fundamental wave. Since there is a reverse phase for a case of 0, and a forward phase for a case of 1, a modulated wave has the length of the fundamental wave 15 period portion. Details of the M-sequence are described in "M-Sequences and Applications", Hiroshi Kashiwagi (25 Mar. 1996, Shokodo), pages 16-36.

When the switch 11 provided in the electronic pen 1 is pressed, the control circuit 101 first supplies a trigger signal, which forms a reference for time measurement, and the M-sequence 4-bit initial condition data to the infrared drive circuit 105 and the M-sequence generation circuit 102. The infrared drive circuit 105 generates an infrared drive signal based on a signal from the control circuit 101. The infrared transmitter 106 is driven by output of the infrared drive circuit 105 and transmits an infrared ray from the electronic pen 1 to space.

On the other hand, the M-sequence generation circuit 102 generates an M-sequence bit string based on an initial condition supplied from the control circuit 101, and supplies this to the ultrasonic wave drive circuit 103. The ultrasonic wave drive circuit 103 performs phase modulation of an ultrasonic wave signal by this M-sequence, to be supplied to the ultrasonic wave transmitter 104 as an ultrasonic wave drive signal. The ultrasonic wave transmitter 104 is driven by this drive signal, and transmits the ultrasonic wave signal that has undergone M-sequence phase modulation, to space, synchronously with transmission timing of the infrared transmitter 106. Therefore, an infrared signal and an ultrasonic wave signal are emitted from the electronic pen towards the reception unit at the same time. In order to actually function as the electronic pen, the abovementioned operation is repeated at a constant period while the switch is pressed.

Since the control circuit 101 is configured from a CPU or the like, rectangular waveforms are often used for respective signal waveforms. The infrared trigger signal forming the reference for time measurement is, as far as possible, preferably a rectangular waveform in order to lessen time misalignment with respect to sampling on a receiver side and to minimize measurement error, but with respect to the ultrasonic wave signal, the ultrasonic wave transmitter 104 is often configured from a piezoelectric element (or a magnetostrictive element), and since the piezoelectric element itself includes L and C components, the ultrasonic wave transmitted to space is a pseudo-sine wave, even if a drive waveform is a rectangular wave. With regard to a waveform on a transmission side, giving consideration to a characteristic of the abovementioned transmitter, there is no particular problem for a sine wave, a rectangular wave, a triangular wave or a trapezoidal wave.

The reception unit 3 is formed from an ultrasonic wave receiver (piezoelectric element, magnetostrictive element, or microphone) 201, a sampling circuit 202, an infrared receiver 203, a detection circuit 204, a memory 205, and a data processing circuit 206.

The ultrasonic wave receiver (piezoelectric element, magnetostrictive element, or microphone) 201 receives the ultrasonic wave signal transmitted from the electronic pen 1 and converts this to an electrical signal. The sampling circuit 202 samples the ultrasonic wave signal at a constant interval, to be stored as phase modulation M-sequence ultrasonic wave data in the memory 205.

The infrared receiver 203 receives an infrared signal from the electronic pen 1 and converts this into an electrical signal. The detection circuit 204 detects the trigger pulse from output of the infrared receiver 203 and stores the arrival time of the trigger pulse in the memory 205. Furthermore, the detection circuit 204 detects M-sequence initial condition data and stores this in the memory 205.

Instead of the M-sequence initial condition being included in the infrared signal, a phase-modulated M-sequence ultrasonic wave model waveform generated in advance based on a prescribed M-sequence initial condition is stored in the memory 205, and when the infrared trigger signal arrives, the data processing circuit 206 may read this M-sequence model waveform.

When the data processing circuit 206 reads the data showing that a trigger pulse has arrived from the memory 205, an M-sequence model waveform is generated from the stored M-sequence initial data and furthermore this model waveform undergoes phase modulation by an ultrasonic wave similarly to the transmission unit 2, and a phase modulation ultrasonic wave M-sequence model waveform having a waveform the same as the ultrasonic wave drive signal on the transmission side is generated. The data processing circuit 206 performs correlation processing between the phase modulation ultrasonic wave model waveform and the phase modulation ultrasonic wave reception waveform stored in the memory 205. When the data processing circuit 206 detects the first peak (main peak) of correlation values, time elapsed from the trigger pulse arrival time up to a point in time at which this correlation value peak is detected, that is, propagation time of the ultrasonic wave signal from the electronic pen 1 to the reception unit 3 is computed.

Specifically, trigger detection time stored in the memory 205 is set to a sampling start time (t), the phase modulation M-sequence ultrasonic wave data is read from the memory 205, and a correlation value C(t) is computed with respect to the sampling start time (t) based on Expression (1) between this read data and the previously generated phase modulation M-sequence ultrasonic wave model waveform.

Expression 1

$$C(t) = \frac{1}{N}\sum_{i=0}^{N-1} r(i)f(i+t) \quad (1)$$

In Expression (1), i is a sampling time variable and is an integral value, N is the number of model waveform samplings, r(i) is a value of a model waveform at sampling time i, and f(i+t) is a value of a received waveform at the sampling time (i+t).

Next, a peak value is searched for from correlated values obtained. If a peak value is not detected, the sampling start time (t) is incremented by a unit quantity 1 only, and the peak value search is repeated in the same way. When a correlation peak value is detected, the sampling time corresponding to the variable t at the time of detection of the correlation peak value is read from the memory 205. Finally, the data processing circuit 206 computes the ultrasonic wave propagation time from the electronic pen 1 as far as the reception unit 3, from the time of the trigger detection and the time of detection of the peak value. With the time of sampling at which the infrared trigger pulse is received as 0, and the sampling period as DT, the ultrasonic wave propagation time can be computed as t×DT.

Frequency range in this type of signal propagation system using an ultrasonic wave is from 20 kHz to 100 kHz, and a speaker/microphone using detection of vibration/capacitance of a diaphragm having a relatively wide frequency band may be considered as transmission and reception devices, but particularly in a case of usage as a transmission device, these devices are costly, and small sized, low power consumption devices have very low sensitivity. On the other hand, a low cost piezoelectric element can only be used close to resonant frequency at which vibration gain is high. Therefore, it is difficult to state that the low cost piezoelectric element possesses an adequate frequency band that is necessary for modulating an ultrasonic wave by the M-sequence signal. As a method of narrowing the frequency band of an M-sequence signal, there is a method of having a plurality of consecutive same-phase waves.

With a piezoelectric element resonant frequency of 40 kHz, if M (M is an integer ≧1) periods of an ultrasonic wave are assigned to each 1 bit of the M-sequence and phase modulation is performed, the necessary frequency band is 40/M (kHz) on one side with 40 kHz as center, that is, (40/M)×2 (kHz) on two sides. This frequency band, with M=3~4 and a piezoelectric element having low Q value, is a range that can provide adequate cover.

However, if the value of M is high, the time for signal transmission increases, which is not suitable for an application requiring high speed, but for an application for which low speed is sufficient, an effective method is to enlarge the value of M. Furthermore, when correlation peak search computation is performed, since (M−1) correlation sub-peaks having values (M−1)/M times the gain of the main peak in principle occur on the two sides of the main peak, particularly in a case where time difference between a reflected wave and a direct wave is small, since it is difficult to identify the position of the main peak due to superimposition of the sub-peaks, it is preferable to make the value of M as small as possible.

Furthermore, in a case of M=1, it is possible to confirm that a correlation value of a phase modulation ultrasonic wave received wave and an M-sequence model wave does not decrease greatly, and as a result of experimentally examining a sensitive frequency band with respect to bit position error, it was possible to confirm that a transmitted ultrasonic wave signal, which has undergone phase modulation, adequately tracks the ultrasonic wave drive waveform in the vicinity of a phase modulation (phase switching) point. In addition, it was clarified that a piezoelectric element having a high gain in the high frequency range has a higher correlation peak valve S/N ratio, and therefore has a good correlation value detection characteristic.

Figure 3:
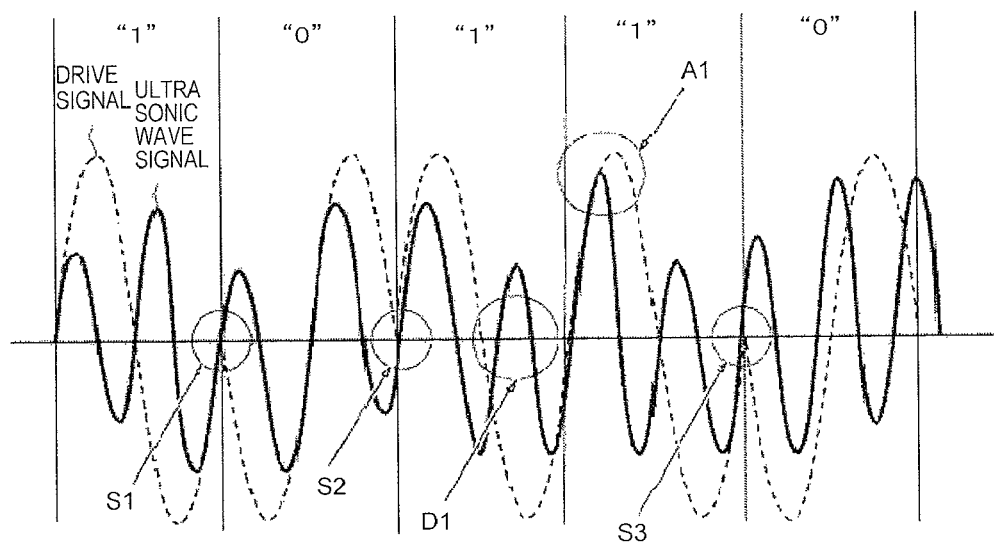
FIG. 3 is one example of a waveform diagram of an M-sequence phase modulation ultrasonic wave drive signal and of a waveform diagram of an ultrasonic wave signal that has been transmitted from a piezoelectric element having resonant frequency double the frequency of the drive signal.

FIG. 3 shows two waveforms: a drive waveform (dotted line) obtained by performing phase modulation of an ultrasonic wave of frequency 20 kHz by a bit string "10110", and a case where a phase modulation ultrasonic waveform (full line) of 40 kHz is transmitted to a space from the piezoelectric element 104 of resonant frequency of 40 kHz. It is understood that the phase of transmission waveform changes in synchronization with phase switching points S1, S2, and S3 of the drive waveform, and tracking with respect to the drive waveform of the transmission waveform is good.

In addition, it is understood that at a point A1 where the drive waveform consecutively changes at the same phase, both waveforms have approximately mutually similar phases and ultrasonic wave gain of the piezoelectric element is amplified, but at point D1 where the two waveforms have approximately inverse phases the ultrasonic wave gain of the piezoelectric element is attenuated, and as a result the transmission output level of the ultrasonic wave becomes uniform. This shows that residual vibration at the resonant frequency of the piezoelectric element is attenuated by vibration driven by a frequency of ½ this resonant frequency. A result is obtained that, in order to suppress the residual vibration included in the transmission ultrasonic wave at the same time as maintaining tracking capability with respect to an ultrasonic wave drive voltage waveform of the ultrasonic wave transmission waveform at a phase (switching) modulation point in this way, the resonant frequency of the piezoelectric element may be set to 2N times (N≧1) the drive frequency of the piezoelectric element.

With regard to the M-sequence model waveform on the receiving side for performing the correlation peak search, since the tracking capability at the phase modulation (switching) point is given priority, the receiving unit 3 uses, as an M-sequence model, a waveform that is completely the same as an M-sequence phase modulation ultrasonic wave drive waveform with which the transmission side drives the piezoelectric element 104, and computes a correlation value with the received ultrasonic waveform.

Figure 4:
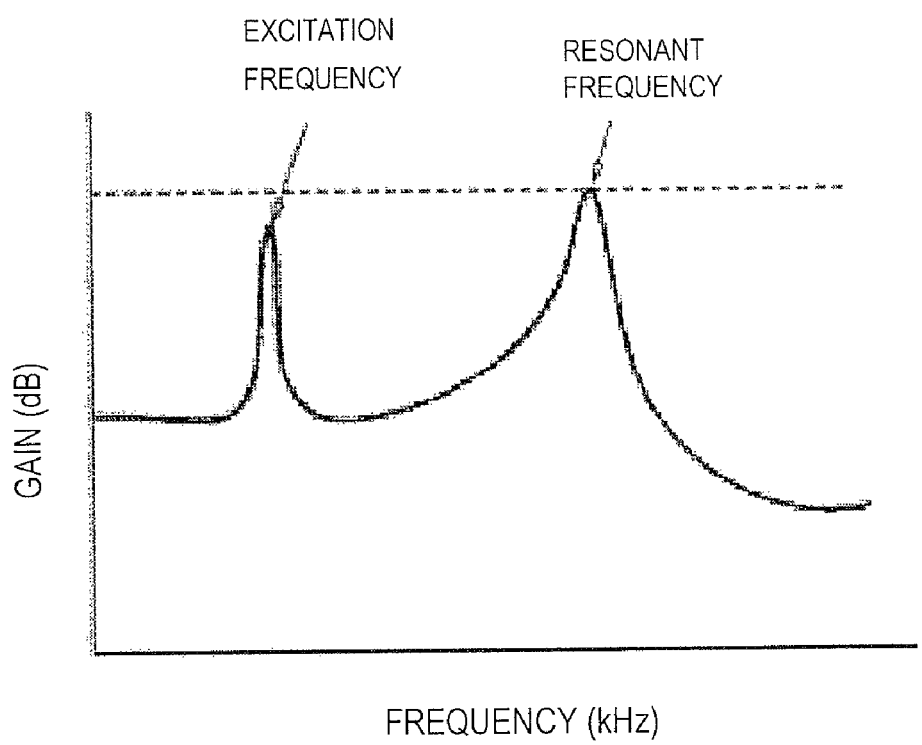
FIG. 4 is one example of a diagram showing vibration gain of a piezoelectric element at a point of excitation and a point of resonance.

Here, as shown in FIG. 4, in order to have the frequency of the ultrasonic wave emitted to space the same as the resonant frequency of the piezoelectric element, not an excitation frequency, with regard to frequency characteristic of a sound wave in an excitation state, amplitude gain at the resonant frequency of the piezoelectric element 104 may be made higher than amplitude gain at the excitation frequency. Implementation is possible by adjustment by increasing or decreasing excitation voltage in practice, or by applying damping at the resonant frequency to the piezoelectric element.

Furthermore, the ultrasonic wave receiver 201 preferably has a frequency band up to 2N times the frequency of the ultrasonic wave drive signal.

Figure 8:
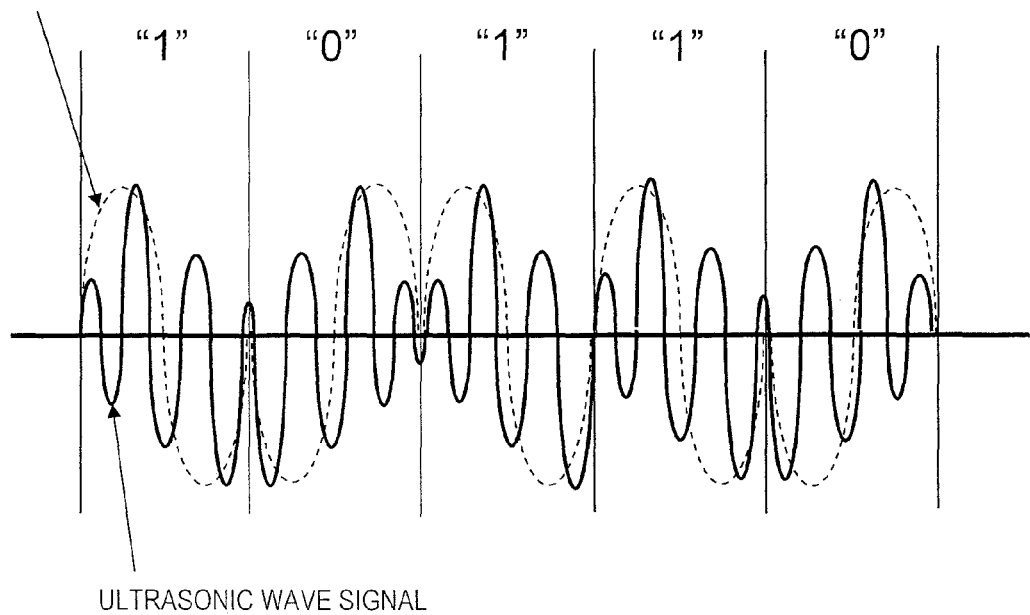
FIG. 8 is a waveform diagram of an M-sequence phase modulation ultrasonic wave drive signal and a waveform diagram of an ultrasonic wave signal that has been transmitted from a piezoelectric element having resonant frequency triple the frequency of the drive signal.

As described above, when the resonant frequency of the piezoelectric element is 2N times the drive frequency, a most preferable performance is obtained, but even for N times (that is, an integral multiple), since variation of gain becomes large but phase modulation component clearly appears as in FIG. 8 (FIG. 8 shows a case of 3 times the resonant frequency), it is possible to perform ultrasonic wave propagation time measurement.

Figure 9:
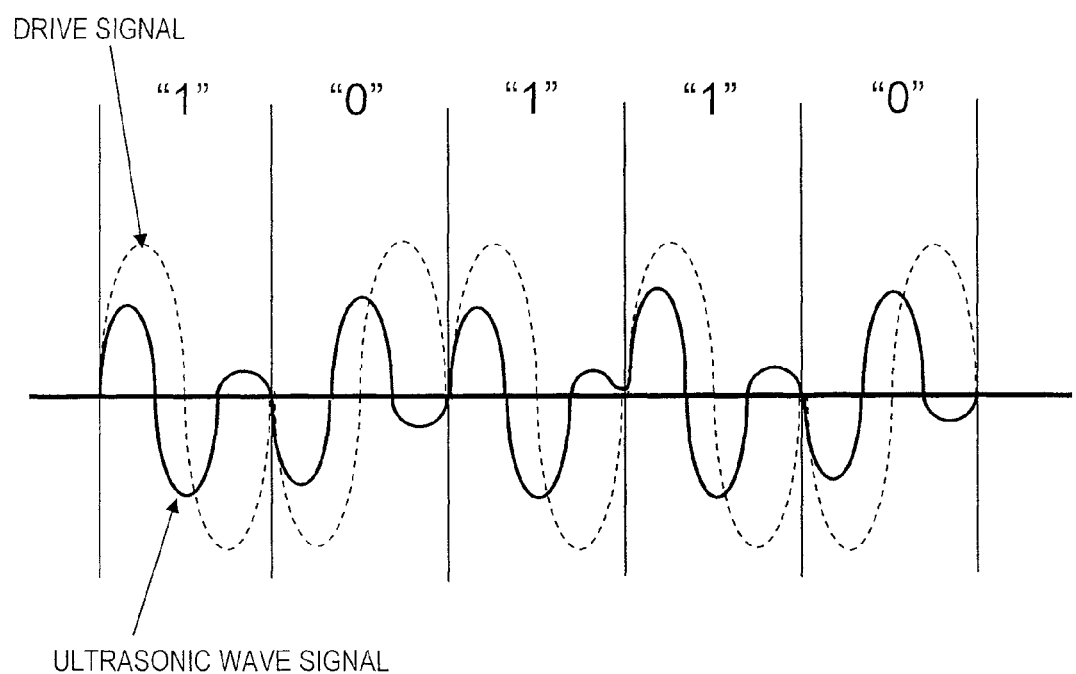
FIG. 9 is a waveform diagram of an M-sequence phase modulation ultrasonic wave drive signal and a waveform diagram of an ultrasonic wave signal that has been transmitted from a piezoelectric element having resonant frequency 1.5 times the frequency of the drive signal.

Furthermore, if there is at least a high frequency, not an integral multiple, in principle the ultrasonic wave propagation time measurement is possible. FIG. 9 is an example of a case where the resonant frequency of the piezoelectric element is a frequency of 1.5 times the drive frequency; with the gain variation being large, and the difference between points of phase modulation and other points being somewhat unclear, there is a tendency for stability and accuracy to be quite low, but the difference between the points of phase modulation and points that are not so, is clearly present, and by emphasizing this difference, the ultrasonic wave propagation time measurement becomes possible.

Figure 10:
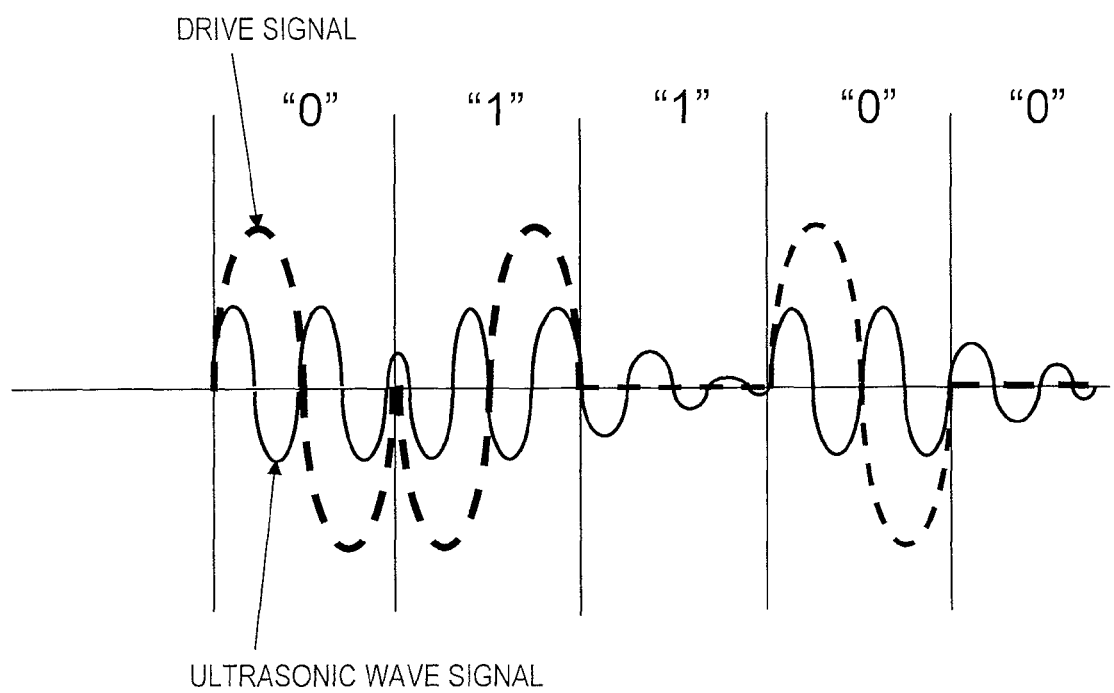
FIG. 10 is an ultrasonic wave transmission waveform diagram in a case where a piezoelectric element on a transmitter side is driven at a phase modulation point only, with regard to the M-sequence phase modulation ultrasonic wave drive signal.

Furthermore, as shown in FIG. 10, in a case of driving the piezoelectric element on the transmitter side at only a phase modulation point, at least, correlation values decrease, but since the effect of residual vibration is also inhibited and in addition the drive signal frequency can be approximately halved, it is possible to reduce overall power consumption.

Figure 5:
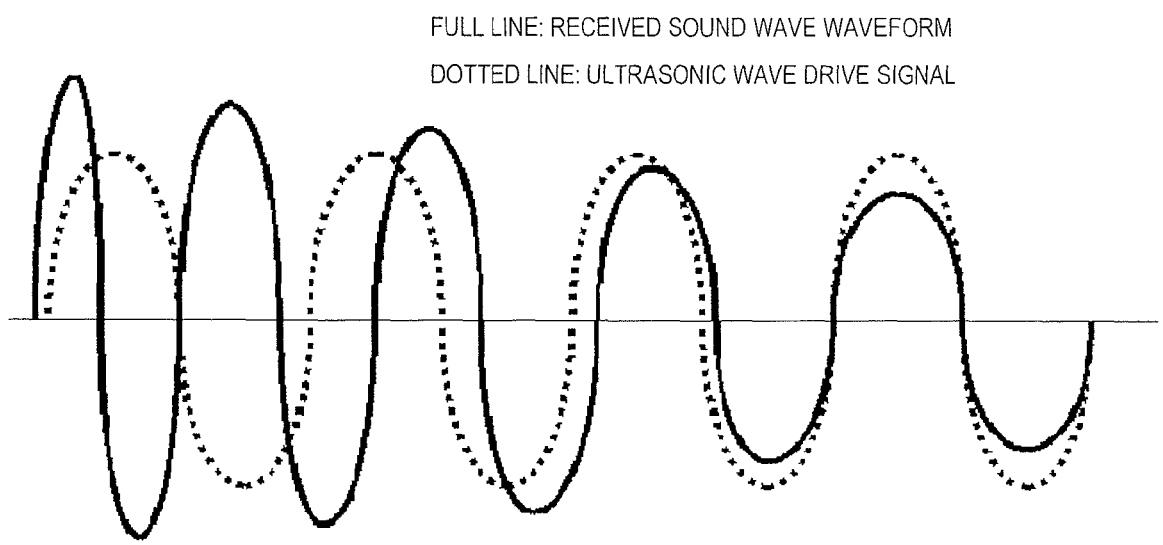
FIG. 5 is a diagram showing one example of an ultrasonic wave reception signal modulated by M-sequence data that has the same successive bits in the end thereof.

Furthermore, in a case of the same bits being consecutive, among the M-sequence data string previously described, as shown in FIG. 5, from the resonant frequency of the piezoelectric element 104, the frequency of the transmitted sound wave approaches the piezoelectric element drive frequency, and energy gain thereof decreases. Conversely, at a phase modulation point at which the data string has different bits, due to having a high proportion of excitation of sound waves higher than the piezoelectric element drive frequency due to the phase modulation component having a high frequency component, a sound wave is transmitted at a point of resonance of the piezoelectric element present on a high frequency side, and the frequency of the transmitted sound wave approaches the resonant frequency of the piezoelectric element 104, and energy gain thereof increases. Therefore, in order to inhibit the residual vibration, it is preferable to have the same bits being consecutive at the end of the M-sequence data string, and in a case where bits at the end are different, the residual vibration becomes large, which is not preferable.

Furthermore, as the number of consecutive bits at the end that are the same becomes large, the residual vibration decreases, and actual correlativity between reception waveform and reference waveform is improved. In a data string generated from a 4th degree characteristic polynomial, portions with 2 consecutive bits are present at 6 to 7 locations, a portion with 3 consecutive bits "000" is present at 1 location, and a case with 4 consecutive bits "1111" is present at 1 location, but an end of "000" and furthermore "1111" are more effective than "00" and "11".

Figure 6:
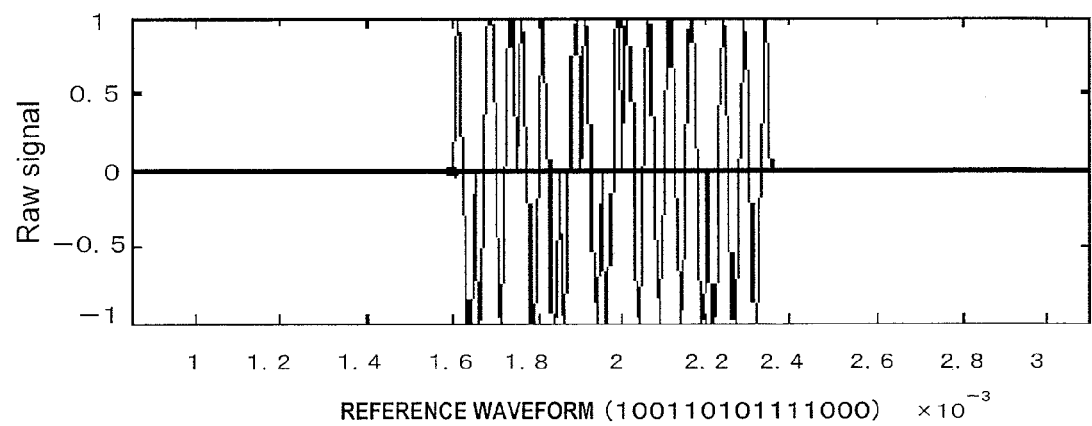
FIG. 6 is a diagram showing one example of a correlation value time history waveform with regard to the ultrasonic wave transmission waveform modulated by the M-sequence data and a reference waveform.
Figure 6:
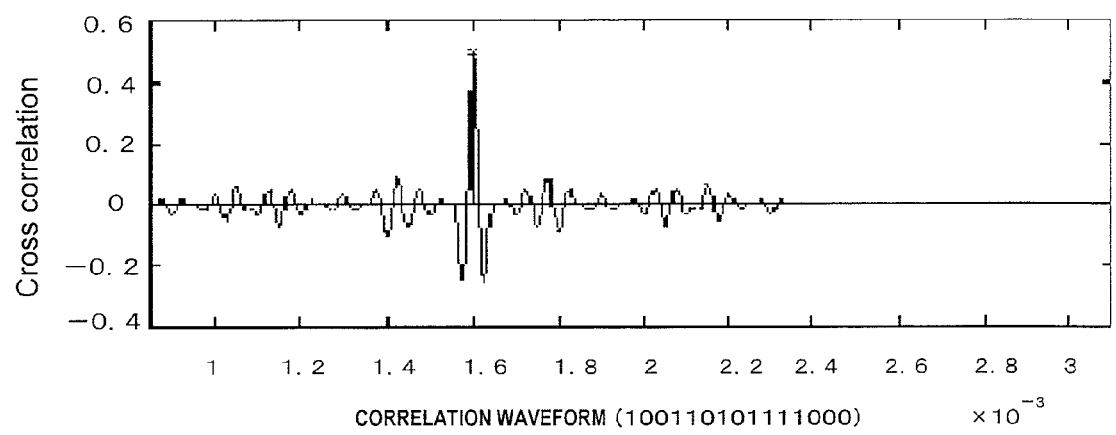
Figure 7:
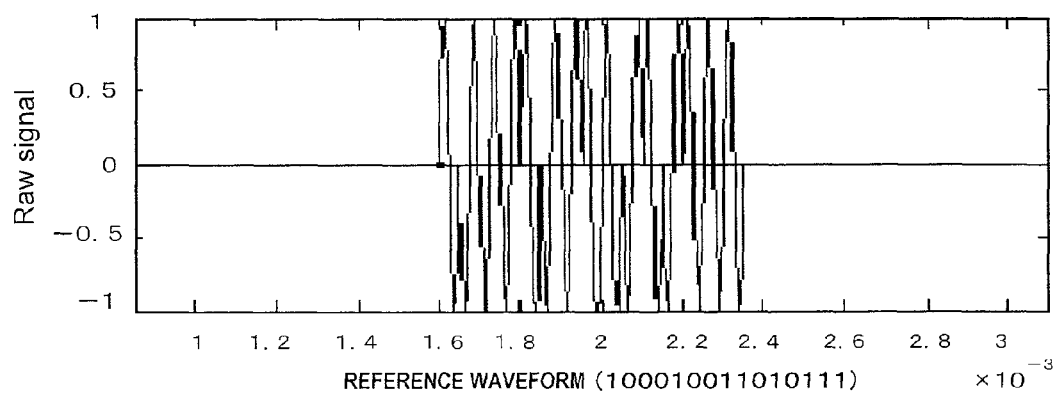
FIG. 7 is a diagram showing another example of a correlation value time history waveform with regard to the ultrasonic wave transmission waveform modulated by the M-sequence data and a reference waveform.
Figure 7:
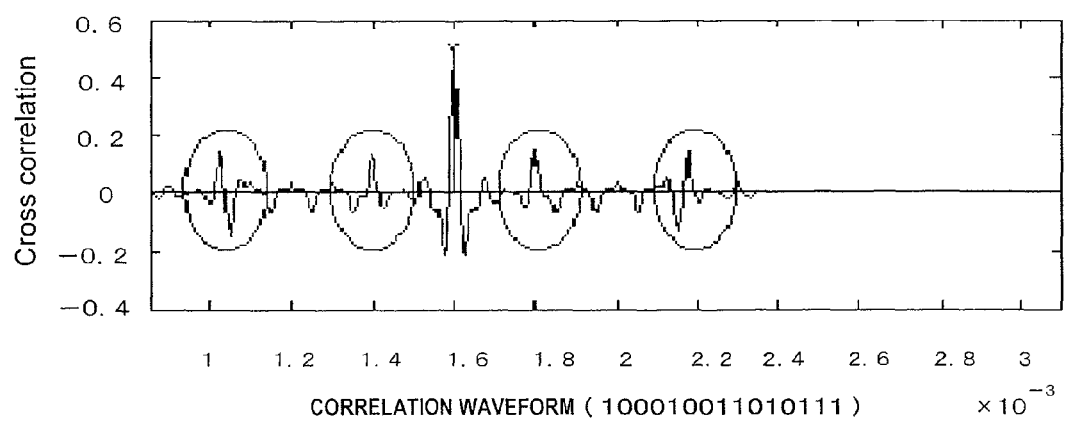

Next, an example of a time history data string of correlation values shown in Expression (1) is referred to as a correlation waveform, and is shown in FIG. 6 and FIG. 7. FIG. 6 is an example modulated by a bit string of "100110101111000" and FIG. 7 is an example modulated by a bit string of "100010011010111". In a general correlation waveform for a 15-bit M-sequence signal, outside of the main peak, side peaks occur therebefore and thereafter, but according to the way of taking the bit string, a difference of the extent of FIG. 6 and FIG. 7 occurs. This is an ideal case, but for a real reception waveform, in a case where surrounding noise, reflected waves, and the like are superimposed, this gain may end up approaching the main peak gain and, according to the algorithm that performs peak detection, there is a high possibility of this causing an erroneous detection. As a result of actually obtaining the correlation waveform for 15 types of bit string, it was established that the larger the difference of the number of phase modulation points in the first half and latter half of the bit string, the smaller the side peak gain.

Therefore, among the bit string generated from the characteristic polynomial $f(x)=x^4+x+1$, bit strings "111100010011010" and "100110101111000" in which a data string "1111000" is included at the beginning or the end of the 15-bits of the M-sequence, respectively, and, among the bit string generated from the characteristic polynomial $f(x)=x^4+x^3+1$, bit strings "000111101011001" and "010110010001111" in which a data string "0001111" is included at the beginning or the end of the 15-bits of the M-sequence, respectively, in comparison to 13 other types of data string, have low side peak gain in the correlation waveform, so that it is possible to improve accuracy of received wave arrival time.

In addition, as previously described, since the residual vibration can be inhibited more for a case where the same bits are consecutive in the end of the M-sequence data string, since, as the M-sequence bit string in the present invention "100110101111000" or "010110010001111", the residual vibration is smaller and the side peaks of the correlation waveform are also smaller, it is possible to measure the ultrasonic wave propagation time at higher speed and higher accuracy.

Finally, with regard to an exemplary embodiment of the present invention that takes the electronic pen system as an example, a detailed description is given making reference to FIGS. 11A to 18B.

Figure 18A:
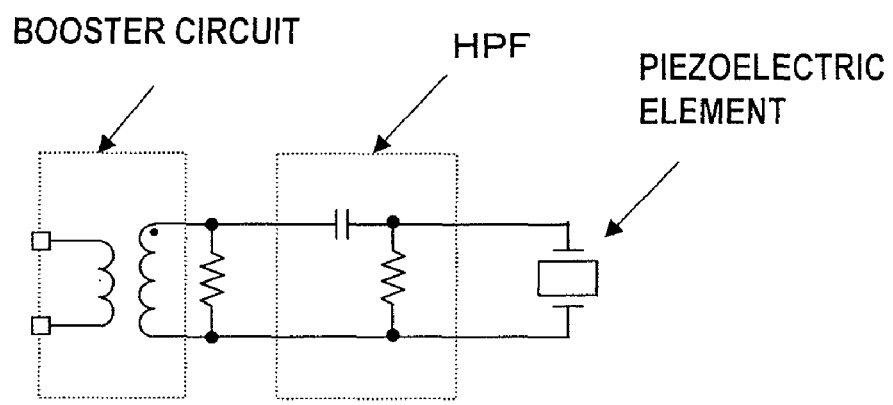
FIGS. 18A and 18B are drawings showing configurations of a filter circuit built into an ultrasonic wave drive circuit in an electronic pen.
Figure 18B:
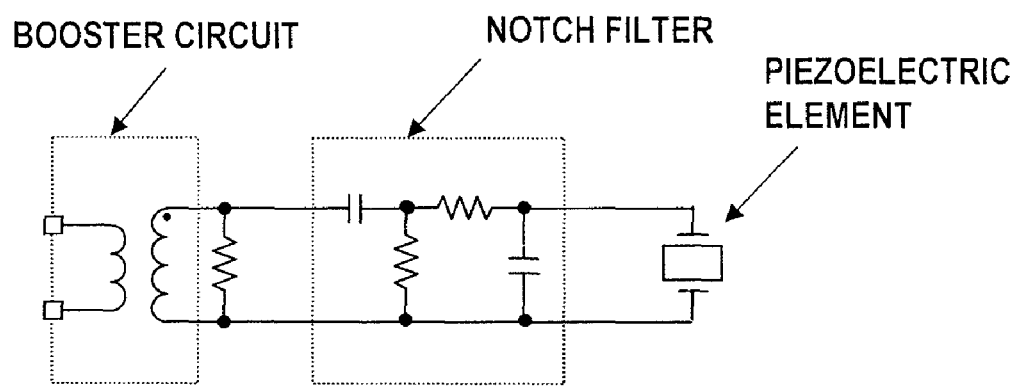

FIGS. 18A and 18B show filter circuits built into a piezoelectric element drive circuit of the electronic pen. FIG. 18A is one example of the wave filter circuit of a pen tip, which performs low-pass cutting, and FIG. 18B is one example of the wave filter circuit of a pen tip, which performs frequency band cutting only. If the wave filter circuit is built in before a booster circuit for driving the piezoelectric element, a characteristic of a booster (a coil of a transformer or the like is often used) is added, so that it is desirable to build it in after boosting. Furthermore, since this is a high voltage unit, parts should desirably be able to withstand high voltage and be configured from passive parts as much as possible.

Figure 11A:
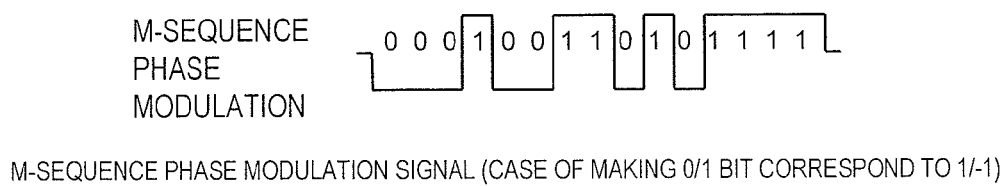
FIGS. 11A and 11B are drawings showing an ultrasonic wave frequency characteristic modulated by an M-sequence bit string.
Figure 11B:
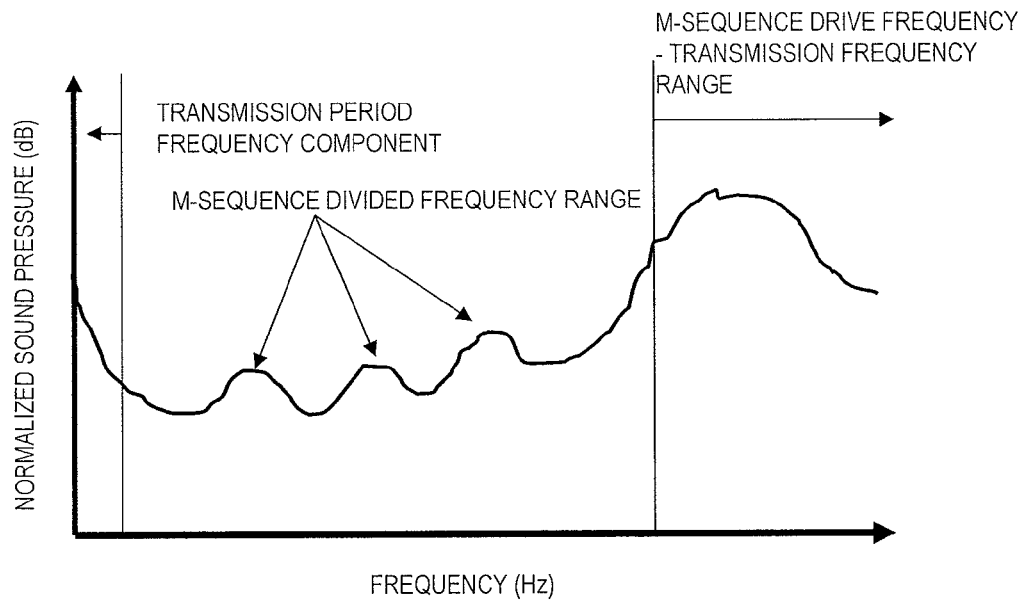

FIGS. 11A and 11B show frequency characteristics of an ultrasonic wave emitted from the electronic pen in a case where there is no wave filter. An ultrasonic wave drive signal modulated by the M-sequence bit string substantively has a characteristic close to a rectangular wave shown in FIG. 11A. Therefore, "10" and "01" bit pattern components are equivalent to the drive signal frequency, but "1100" or "0011" components are equivalent to being driven by ½ the frequency. In the same way, ⅓ and ¼ of the frequency components are included in the drive frequency. Therefore, with the ultrasonic wave signal emitted to space also, since sound pressure of ½, ⅓, and ¼ frequency components of the drive frequency are high, in a case where these frequencies are in an audible range, they can be heard by a human.

Since there are at least 15 waves present in the ultrasonic wave modulated by the M-sequence and, with respect to 1 to 3 burst waves that have been often used heretofore, there are many waves and the energy of the sound waves becomes large, stress may be given to humans in application of the electronic pen and the like. Furthermore, the ultrasonic wave transmission period is often 10 to 20 ms, so that ultrasonic waves generated with this period become sounds of 50 to 100 Hz if viewed in macro. Since this sound is heard as an irritating sound by humans, it becomes a cause of stress for humans.

Figure 12:
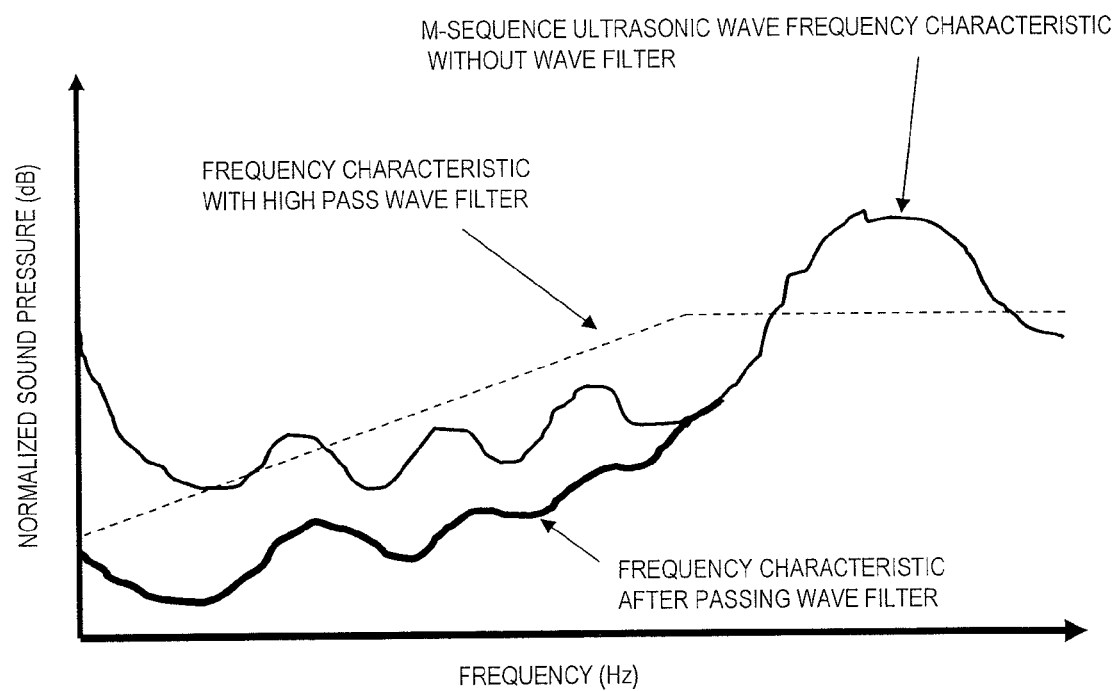
FIG. 12 is a drawing showing a frequency characteristic of a transmission wave in a case where, with regard to FIGS. 11A and 11B, a high pass wave filter is inserted.

Therefore, first as in FIG. 12, if a filter is inserted through which sound waves greater than or equal to the drive frequency pass through and sound waves lower that this are inhibited, divided frequency of the drive period and the ultrasonic wave drive frequency both undergo damping, and sound pressure audible to humans is greatly inhibited. However, since this ultrasonic wave transmission signal does not have a low frequency component, the phase modulation component gain becomes small and there is a tendency for the correlation value to decrease.

Figure 13:
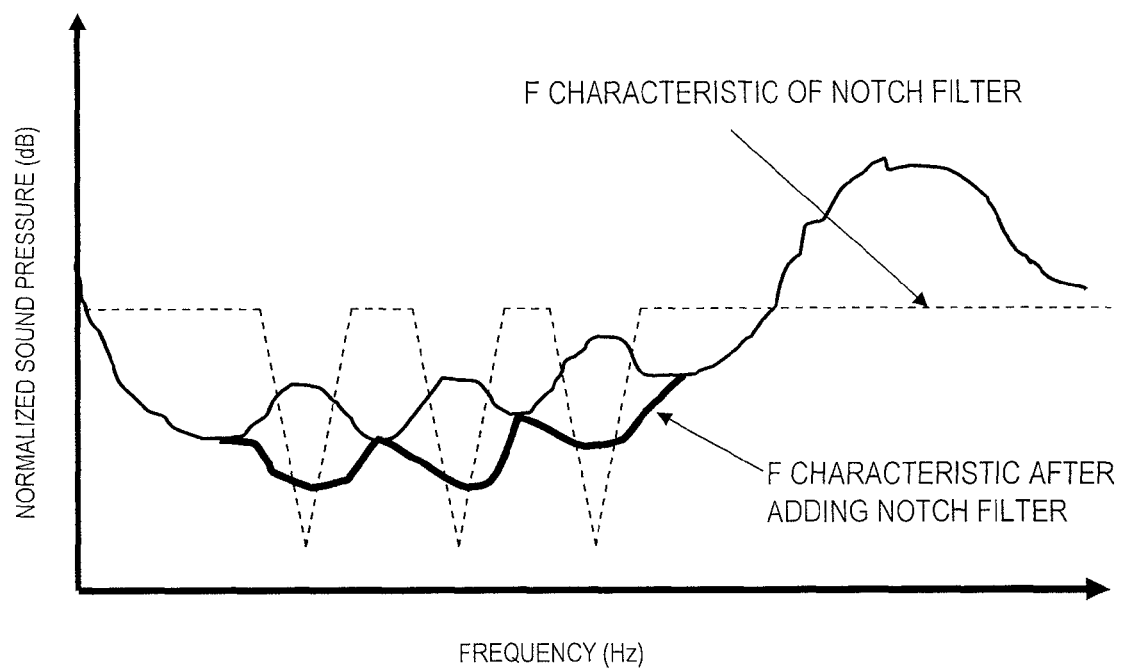
FIG. 13 is a drawing showing a frequency characteristic of a transmission wave in a case where, with regard to FIGS. 11A and 11B, a notch-filter is inserted in a divided frequency range depending on an M-sequence.

Therefore, as shown in FIG. 13, if filtering is performing only on a frequency range that is a problem, missing frequency components become small, lowering of overall system performance is minimized, and it is possible to realize noise reduction. However, since this leads to increased cost, it is important to select a frequency having the highest effect.

Figure 14:
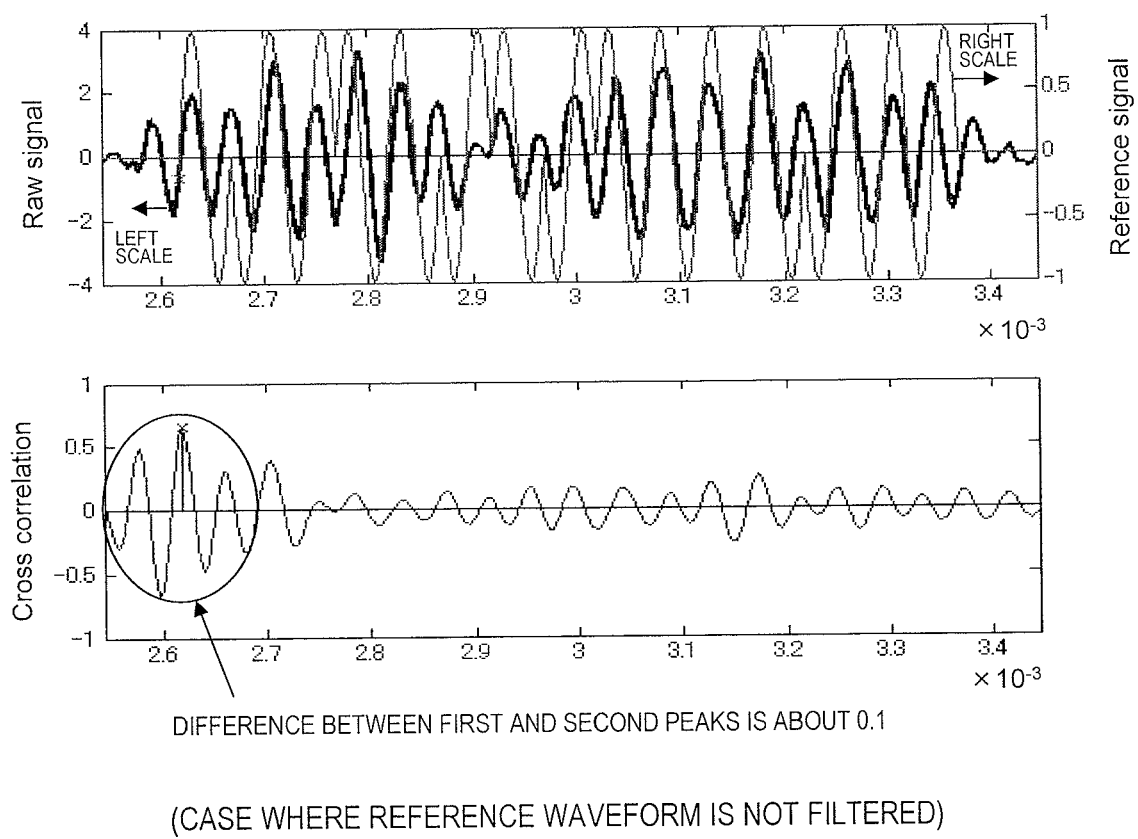
FIG. 14 is a drawing showing correlation values in a case of a reference waveform as a transmission wave that is not filtered.
Figure 15:
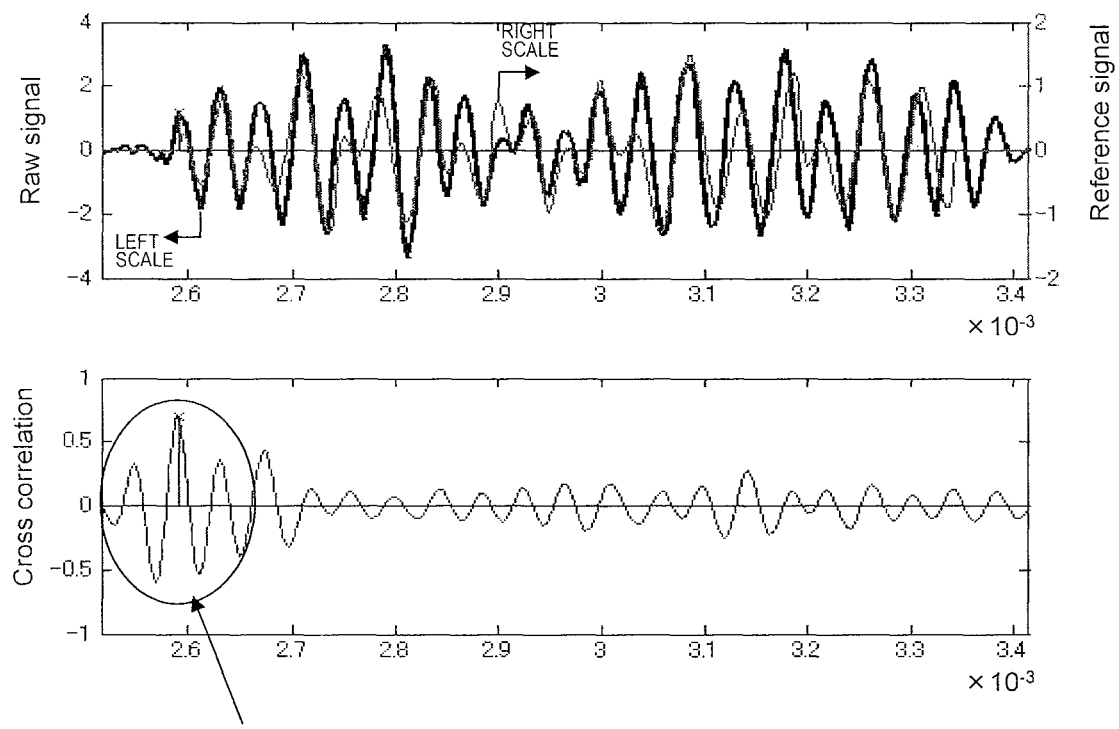
FIG. 15 is a drawing showing correlation values in a case of a reference waveform as a transmission wave that is filtered.
Figure 16A:
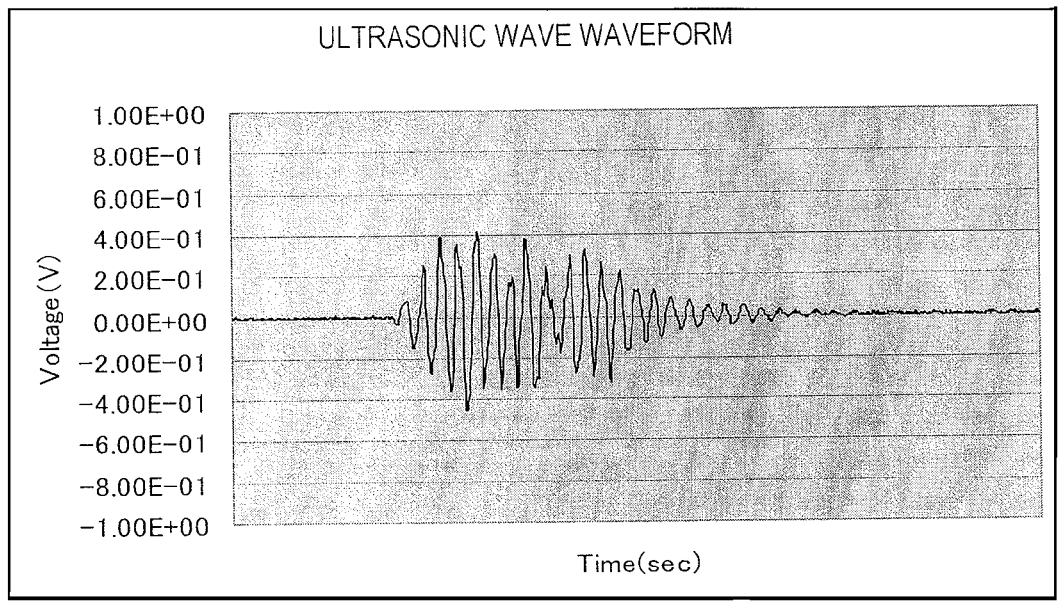
FIGS. 16A and 16B are drawings showing one example in which ultrasonic wave transmission intensity changes by selecting the M-sequence bit string.
Figure 16B:
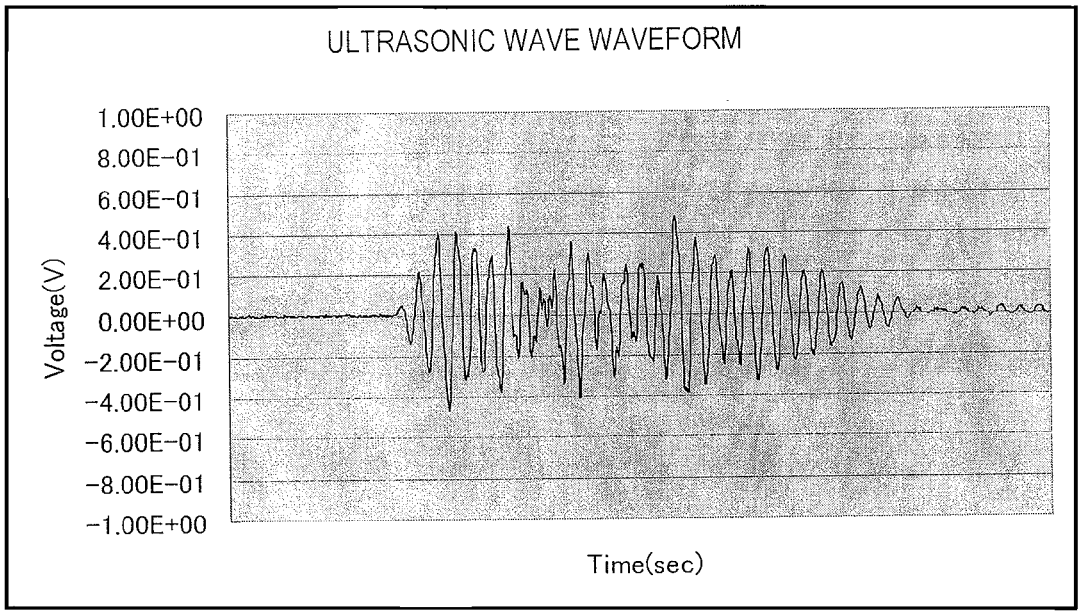
Figure 17A:
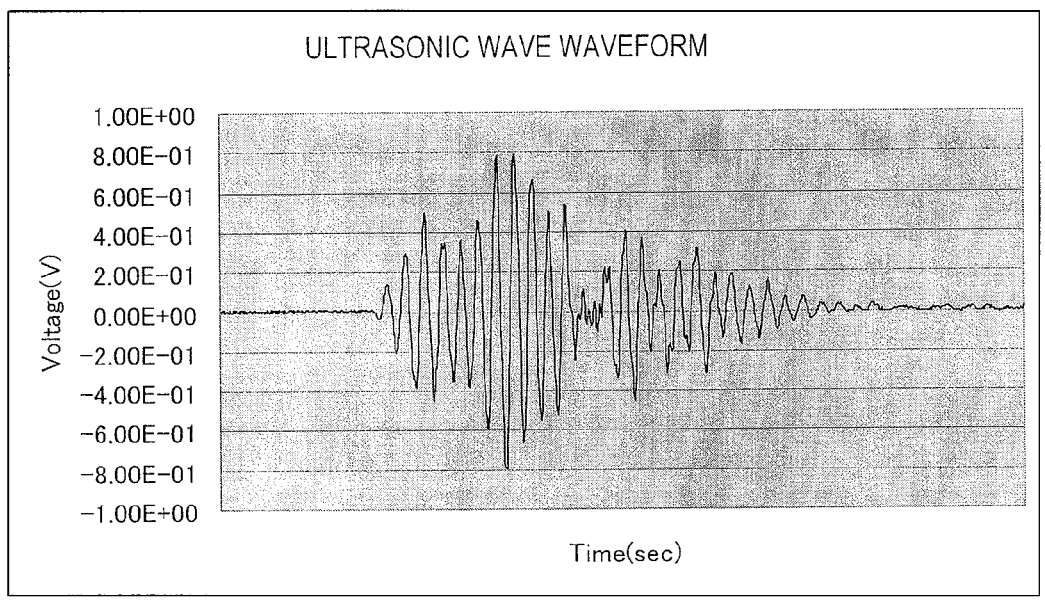
FIGS. 17A and 17B are drawings showing another example in which ultrasonic wave transmission intensity changes by selecting the M-sequence bit string.
Figure 17B:
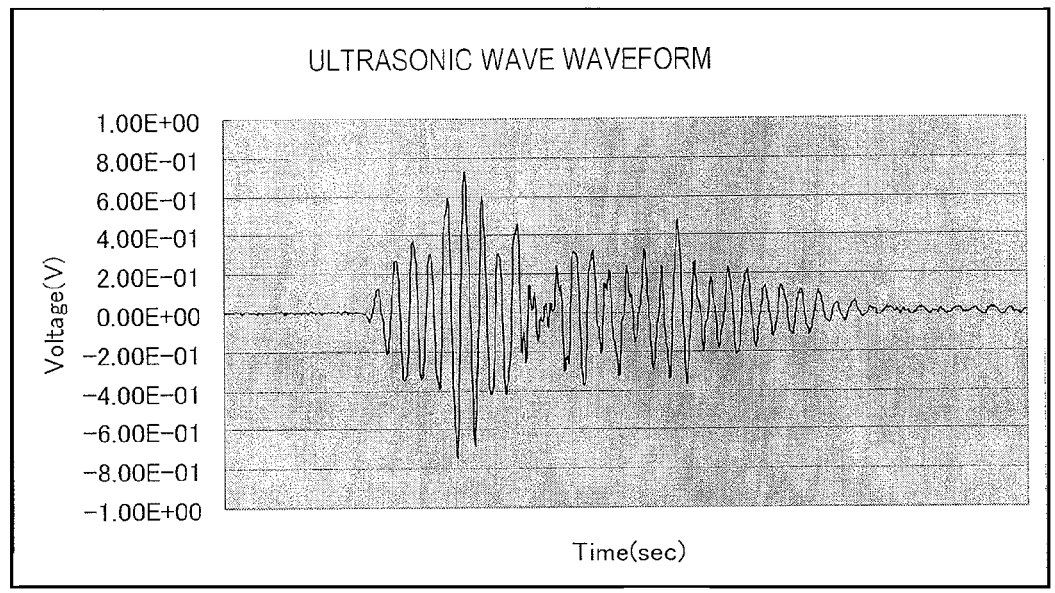

FIG. 14 and FIG. 15 indicate an example showing, with the purpose of covering for the missing frequency components, an effect in a case of a reference waveform with which correlation computation is performed, as an ultrasonic wave transmission waveform after filtering. FIG. 14 shows a case without filtering in the reference waveform, and FIG. 15 shows a case with filtering in the reference waveform. By comparing FIG. 14 and FIG. 15, by having the reference waveform as the transmission waveform after filtering, as a result of gain difference of the largest peak of the correlation values and a peak therebefore being enlarged from 0.1 to 0.4, it is understood that there is a high probability of improving accuracy of the peak search by the correlation computation.

FIGS. 16A, 16B, 17A and 17B are examples showing sound pressure of ultrasonic wave transmission signals changing, by the M-sequence bit string. Each of the drawings show voltage change as a time series in a case of using an M-sequence bit pattern that is shown. From FIGS. 16A, 16B, 17A and 17B, it is understood that the more the end of the M-sequence bit series has the same consecutive bits, the smaller the sound pressure peaks become, and furthermore, as the final bit string becomes "1111000" (FIG. 16A), the smaller the sound peak becomes. By selecting the M-sequence bit string in this way, it is possible to realize noise reduction.

The various disclosures of the abovementioned Patent Document are incorporated herein by reference thereto. A description has been given above according to the embodiments of the present invention as described above, but the present invention is not limited to only configurations of the abovementioned embodiments and clearly includes every type of transformation and modification that a person skilled in the art can realize within the scope of the claims of the invention.

The invention claimed is:

1. An ultrasonic wave propagation time measuring system, comprising:
    an electromagnetic wave transmission unit transmitting an electromagnetic wave signal indicating transmission timing;
    a unit generating an ultrasonic wave drive signal by modulating an ultrasonic wave based on a pseudo-random signal with high autocorrelativity at the same time as the transmission of said electromagnetic wave signal;
    an ultrasonic wave transmission unit that is driven by said ultrasonic wave drive signal, and formed from a piezoelectric or magnetostrictive element for transmitting an ultrasonic wave signal of frequency higher than a fundamental frequency of said ultrasonic wave drive signal;
    an electromagnetic wave reception unit detecting said electromagnetic wave signal;
    an ultrasonic wave reception unit detecting said transmitted ultrasonic wave signal; and
    a data processing unit, having a waveform the same as said ultrasonic wave drive signal as a model waveform, that computes correlation values between a detected ultrasonic wave signal and said model waveform, detects a main peak value of computed correlation values, and computes ultrasonic wave propagation time from a point in time of detection of said electromagnetic wave signal and a point in time of detection of said main peak value.

2. The ultrasonic wave propagation time measuring system according to claim 1, wherein said ultrasonic wave transmission unit has a point of resonance at a frequency higher than a frequency of said ultrasonic wave drive signal.

3. The ultrasonic wave propagation time measuring system according to claim 2, wherein said ultrasonic wave transmission unit has a point of resonance at a frequency that is substantively an integral multiple of the frequency of said ultrasonic wave drive signal.

4. The ultrasonic wave propagation time measuring system according to claim 3, wherein said ultrasonic wave transmission unit has a point of resonance at a frequency that is substantively an even multiple of the frequency of said ultrasonic wave drive signal.

5. The ultrasonic wave propagation time measuring system according to claim 1, wherein, with regard to said modulated ultrasonic wave drive signal, M periods (M is an integer $\geqq 1$) of an ultrasonic wave are assigned per 1 bit of said pseudo-random signal.

6. The ultrasonic wave propagation time measuring system according to claim 1, wherein said ultrasonic wave drive signal generation unit performs phase modulation of said ultrasonic wave.

7. The ultrasonic wave propagation time measuring system according to claim 1, wherein said ultrasonic wave drive signal is generated at a signal beginning and at least a phase modulation point.

8. The ultrasonic wave propagation time measuring system according to claim 1, wherein said pseudo-random signal is M-sequence data.

9. The ultrasonic wave propagation time measuring system, wherein, with regard to said M-sequence data of claim 8, said M-sequence data is a code formed from 15 bits generated by a 4th degree characteristic polynomial, and the end of a bit string has at least 2 bits said same.

10. The ultrasonic wave propagation time measuring system according to claim 1, wherein vibration gain for resonant frequency of said ultrasonic wave transmission unit is larger than vibration gain for frequency of said ultrasonic wave drive signal.

11. The ultrasonic wave propagation time measuring system according to claim 1, wherein said electromagnetic wave signal is infrared.

12. The ultrasonic wave propagation time measuring system according to claim 1, wherein said ultrasonic wave reception unit has a frequency band greater than or equal to the frequency of said ultrasonic wave drive signal.

13. The ultrasonic wave propagation time measuring system according to claim 12, wherein said ultrasonic wave reception unit has a frequency band up to a frequency that is an even multiple of the frequency of said ultrasonic wave drive signal.

14. The ultrasonic wave propagation time measuring system according to claim 1, wherein said ultrasonic wave transmission unit is installed in a movable body.

15. The ultrasonic wave propagation time measuring system according to claim 14, wherein said moveable body is an electronic pen or a robot.

16. The ultrasonic wave propagation time measuring system, wherein, with regard to said M-sequence data of claim 9, said M-sequence data is a code formed from 15 bits generated by a 4th degree characteristic polynomial, and the end of a bit string is 1111 or 000.

17. The ultrasonic wave propagation time measuring system, wherein, with regard to said M-sequence data of claim 16, said M-sequence data is a code formed from 15 bits generated by a 4th degree characteristic polynomial, and the end of a bit string is a sequence of 1111000.

18. The ultrasonic wave propagation time measuring system according to claim 1, further comprising a wave filter for eliminating a drive signal in an audible range, in an ultrasonic wave generation circuit making up said ultrasonic wave transmission unit.

19. The ultrasonic wave propagation time measuring system according to claim 1, further comprising a wave filter for eliminating a sound wave in a frequency range corresponding to at least a period of said ultrasonic wave transmission, in an ultrasonic wave generation circuit making up said ultrasonic wave transmission unit.

20. The ultrasonic wave propagation time measuring system according to claim 1, further comprising a wave filter for eliminating a sound wave at least in a frequency range corresponding to a modulation period of an M-sequence code, in an ultrasonic wave generation circuit making up said ultrasonic wave transmission unit.

* * * * *